3,277,188
2-FLUORO-3-HYDROXYPROPENE
Joseph P. Henry, South Charleston, and Leonard O. Moore, Charleston, W. Va., assignors to Union Carbide Corporation, a corporation of New York
No Drawing. Original application July 6, 1960, Ser. No. 41,014, now Patent No. 3,215,746, dated Nov. 2, 1965. Divided and this application Aug. 8, 1961, Ser. No. 129,944
1 Claim. (Cl. 260—633)

This application is a division of application Serial No. 41,014 filed July 6, 1960, now U.S. Patent No. 3,215,746, by Joseph P. Henry and Leonard O. Moore.

This invention relates to the preparation of fluoroallyl chloride, and to the preparation of novel and useful derivatives of fluoroallyl chloride.

This invention is based on the discovery that the interaction of chlorine and 2-fluoropropene unexpectedly produces the valuable compound fluoroallyl chloride (3-chloro-2-fluoropropene-1):

$$Cl_2 + CH_2=CF-CH_3 \rightarrow CH_2=CFCH_2Cl$$

The reaction proceeds readily both in liquid phase and vapor phase in the presence or absence of a diluent. The process can be conducted either batchwise or continuously.

Fluoroallyl chloride is produced in the process at temperatures as low as $-80°$ C. and as high as $250°$ C. In a typical batch process, the reaction can be conducted at a temperature between $-80°$ C. and $30°$ C. for a reaction period between about one hour and ten hours depending on the rate of mixing, rate of heat transfer, and the like.

In a continuous method of operation in the vapor phase, chlorine and 2-fluoropropene are passed through a reaction zone maintained at a temperature between about $-20°$ C. and $250°$ C. for a residence time of about 0.1 to 10 seconds. In a continuous method of operation in the liquid phase, the reactants, preferably dissolved in a diluent, are passed through a reaction zone maintained at a temperature between about $-80°$ C. and $0°$ C. for a residence time of about one to twenty-five seconds. The upper reaction temperature limit of the liquid phase reaction can be raised by the use of superatmospheric pressures.

Diluents such as hydrocarbons and halocarbons can be employed if desired. Preferred diluents are halocarbons such as carbon tetrachloride, trichlorofluoromethane, ethylene dichloride, chloropentafluoroethane, dichlorotetrafluoroethane, trichlorotrifluoroethane, difluoroethane, halopropanes, halobutanes, and the like.

The molar ratio of chlorine and 2-fluoropropene employed in the process can vary over a broad range between about 0.1 and 1.5 moles of chlorine per mole of 2-fluoropropene. Generally, a molar ratio of between 0.25 and 1.0 mole of chlorine per mole of 2-fluoropropene is preferred for both a liquid phase process and a vapor phase process.

The fluoroallyl chloride product is recovered from the process as a component of a product mixture. The product mixture generally contains a major amount of fluoroallyl chloride, and minor amounts of 2-chloro-2-fluoropropane, 1,2-dichloro-2-fluoropropane, and some high boiling material. The fluoroallyl chloride is readily isolable by fractional distillation of the mixture.

Fluoroallyl chloride is a valuable synthesis intermediate because of the polyfunctional nature of the compound. A particularly valuable utility for fluoroallyl chloride is for the introduction of the fluoroallyl radical into organic compounds.

The double bond of fluoroallyl chloride can add the elements of halogen, hydrohalic acids, and the like, in the manner of other olefinic compounds. The double bond also is susceptible to reaction under the conditions of the Diels-Alder condensation reaction. Fluoroallyl chloride is polymerizable in the manner of vinyl halide as was demonstrated by the formation of polymer from fluoroallyl chloride with acrylonitrile or methyl methacrylate as comonomers.

Fluoroallyl chloride can be converted to the novel derivative, fluoroallyl amine (boiling point $70°$ C., $n_D^{20}$ 1.4029) by reacting fluoroallyl chloride with ammonia at a temperature between $0°$ C. and $100°$ C. for a reaction period between about five and sixty minutes. Fluoroallyl amine (3-amino-2-fluoropropene) is useful as a chemical intermediate. The amino group provides a reactive site for interaction with acids, acid anhydrides, epoxides, isocyanates, and the like. The reaction between fluoroallyl chloride with organic amines (e.g., methylamine and diethylamine) produces the respective 3-amino-2-fluoropropene derivatives.

Fluoroallyl chloride can be converted to a useful class of fluoroallyl alkyl ether derivatives by reacting fluoroallyl chloride with alkali metal alkoxide (e.g., sodium methoxide or potassium octoxide), or with a strong base in the presence of alkanol (e.g., sodium hydroxide in methanol or potassium hydroxide in ethanol), at a temperature between $25°$ C. and $150°$ C. for a reaction period between about one-half hour and ten hours. One of the compounds of this class reported in the chemical literature, fluoroallyl ethyl ether, has been prepared in a difficult manner by the elimination of hydrogen bromide from 3-bromo-2-fluoropropyl ethyl ether. Hence, by the practice of the present invention, a class of fluoroallyl alkyl ether compounds is made readily available by a novel and convenient synthesis from fluoroallyl chloride. The class of allyl alkyl ethers so produced corresponds to the formula $CH_2=CFCH_2OR$, wherein R is an alkyl group containing between one and eight carbon atoms.

Fluoroallyl chloride can also be converted to the valuable new compound, fluoroallyl alcohol (boiling point $52°$ C. to $55°$ C./100 millimeters of mercury, $n_D^{20}$ 1.3892), by hydrolyzing fluoroallyl chloride with water at a temperature between $50°$ C. and $150°$ C. for a reaction period between about one hour and forty-eight hours. It is preferred to include a reagent in the reaction medium which removes the hydrogen chloride as it is formed, e.g., a mild base such as an alkali metal carbonate. Catalysts such as copper powder may also be included. Fluoroallyl alcohol (2-fluoro-3-hydroxypropene) is useful as a chemical intermediate, e.g., for the synthesis of biologically active compounds such as anti-narcotic agents. Fluoroallyl alcohol is particularly interesting because it has been found that this compound has an extreme toxicity. The toxicity to rats and rabbits was measuared as $LD_{50}$ of 0.0031 ml./kg. by skin penetration [ relative toxicity test, Thompson W. R., Bacteriol. Rev., 11, 115 (1947)].

The chloride atom of fluoroallyl chloride is generally displaceable in the manner of a halide atom in an allyl position. Hence, the chloride atom is displaceable by groups which include hydroxyl, amino, alkoxyl, acyloxy and halo, as well as azido, cyano, thiol, silyl, and the like.

The following examples will serve to illustrate specific embodiments of the invention.

*Example 1*

To 177 grams (2.95 moles) of 2-fluoropropene in a brown tinted-glass flask at a temperature of $-78°$ C. to $-72°$ C. was added by vaporization 214 grams (3.02 moles) of chlorine over a reaction period of five hours. The reaction mixture was warmed slowly to a temperature of $30°$ C., water was added and the mixture was distilled to a head temperature of $100°$ C. Fractionation of the oil isolated from the steam distillation yielded 34 grams (12 percent) of 2-chloro-2-fluoropropane, boiling point 35° C., $n_D^{20}$ 1.3586; 87 grams (31.2 percent) of fluoroallyl chloride, boiling point 55° C., $n_D^{20}$ 1.3985; 87 grams (22.5 percent) of 1,2-dichloro-2-fluoropropane, boiling point 86° C. to 90° C., $n_D^{20}$ 1.4110; and 76 grams of higher boiling products.

*Example 2*

To 56 grams (0.93 mole) of 2-fluoropropene in a brown tinted-glass flask at a temperature of −54° C. to −47° C., was added 65.4 grams (0.92 mole) of chlorine over a reaction period of two hours. The reaction mixture was warmed slowly to a temperature of 40° C. with constant stirring, then water was added and the mixture was distilled to a distillation head temperature of 100° C. An oil layer was separated, dried and fractionally distilled to yield 8 grams (8.9 percent) of 2-chloro-2-fluoropropane; 34.6 grams (39.3 percent) of fluoroallyl chloride; and 22.4 grams (18.3 percent) of 1,2-dichloro-2-fluoropropane.

*Example 3*

2-fluoropropene (411 grams, 6.84 moles) was dissolved in 1,2-dichloro-1,1,2,2-tetrafluoroethane (1275 grams) in a brown tinted-glass flask, at a temperature of −40° C., and chlorine gas (435 grams, 6.3 moles) was added slowly to the solution with a nitrogen purge over a reaction period of six hours. After warming the reaction mixture to room temperature, 600 grams of product were recovered by distillation. Water (150 milliliters) was added to the residue and distillation was continued to a distillation head temperature of 100° C. An additional 99 grams of organic material was obtained in this manner. Fraction distillation of the combined distillates yielded 38.5 grams (9.4 percent) of 2-fluoropropene, 1252 grams of 1,2-dichloro-1,1,2,2-tetrafluoroethane, 14 grams (2.1 percent) of 2-chloro-2-fluoropropane, 373 grams (57.7 percent) of fluoroallyl chloride, and 81 grams (9.1 percent) of 1,2-dichloro-2-fluoropropane.

*Example 4*

This example illustrates the preparation of fluoroallyl chloride in a continuous vapor phase process.

A reactor was employed which consisted of a mixing chamber and a coil which was arranged so that all of it could be immersed in a heating or cooling bath. The mixing chamber consisted of a stainless steel pipe (⅜-inch I.D., 6 inches long) with a ¼-inch O.D. thermocouple well extending to within one inch of the bottom. Two inlet tubes were attached on the same side near the top. To the bottom of the mixing section was attached a ⅛-inch I.D. copper coil. The total volume of the mixing and coil sections was 18 milliliters. The coil extended into a flask maintained at a temperature of −40° C. for collecting most of the product mixture. A water scrubber was utilized to remove hydrogen chloride from the effluent gaseous stream which was collected in a Dry Ice-cooled trap. The reactor was maintained at a temperature of 80° C. to 90° C.

The process was conducted by feeding the reactants as 50 weight percent solutions in dichlorotetrafluoroethane. These were metered through rotometers under pressure as liquids. By this procedure, 227 grams per hours of 2-fluoropropene and 119 grams per hours of chlorine were reacted, and distillation of the recovered product yielded 56.9 percent of unreacted 2-fluoropropene, 3.8 percent of 2-chloro-2-fluoropropane, 26.1 percent (60.6 percent efficiency) of fluoroallyl chloride, and 6.9 percent of 1,2-dichloro-2-fluoropropane.

*Example 5*

Employing the same method and apparatus described in Example 4, 100 grams per hour of chlorine diluted with an equal weight of dichlorotetrafluoroethane, and 261 grams per hour of 2-fluoropropene diluted with an equal weight of dichlorotetrafluoroethane, were mixed together at a temperature of −60° C. to −40° C. The product mixture recovered by distillation contained 65.5 percent of unreacted 2-fluoropropene, 1.4 percent of 2-chloro-2-fluoropropane, 18.9 percent (54.7 percent efficiency) of fluoroallyl chloride, and 4.8 percent of 1,2-dichloro-2-fluoropropane.

*Example 6*

2-fluoropropene and chlorine, at a flow rate of 273 grams per hour and 66 grams per hour, respectively, were reacted at a temperature between 245° C. and 250° C. in the same apparatus described in Example 4 with the exception that feed rates were measured through capillary gas flow meters. This rate represented a contact time of about 0.25 second. Fractional distillation of the recovered product yielded 68.8 percent of unreacted 2-fluoropropene, 0.9 percent of 2-chloro-2-fluoropropane, 9.1 percent (29 percent efficiency) of fluoroallyl chloride, and 5.2 percent of 1,2-dichloro-2-fluoropropane.

*Example 7*

This example illustrates the preparation of fluoroallyl ethyl ether.

A solution of 15 grams (0.159 mole) of fluoroallyl chloride and 95 grams of 10 percent ethanolic potassium hydroxide was maintained at a temperature of 50° C. for a reaction period of two hours. Water was added and the reaction mixture was distilled to a distillation head temperature of 100° C. The distillate was extracted with ether to separate the organic phase from the aqueous phase. The ether solution was dried and by distillation there was recovered 7 grams (42.4 percent yield) of fluoroallyl ethyl ether, boiling point 70° C. to 76° C. An analytical sample was prepared by redistillation, boiling point 77° C., $n_D^{20}$ 1.3771.

In the same manner as above, the use of methanolic sodium hydroxide instead of ethanolic potassium hydroxide produces fluoroallyl methyl ether.

*Example 8*

This example illustrates the preparation of fluoroallyl alcohol.

To a mixture of 700 grams of water, 159 grams (1.15 moles) of potassium carbonate, and 5 grams of copper powder, was added 94.5 grams (1.0 mole) of fluoroallyl chloride at a rate to maintain the reaction temperature over 90° C. The addition step required a twenty-hour period. The reaction mixture was cooled and then extracted with ether. Distillation of the extract yielded 36 grams (47.3 percent) of fluoroallyl alcohol, boiling point 52° C. to 55° C./100 millimeters of mercury, $n_D^{20}$ 1.3892, $d_{25}^{25}$ 1.5515

*Example 9*

This example illustrates the preparation of fluoroallyl amine.

A mixture of 107 grams of ammonia and 45 grams (0.48 mole) of fluoroallyl chloride was rocked for a period of fifteen minutes at a temperature of 60° C. in a one-liter bomb. Distillation of the reaction mixture yielded 14 grams (39.2 percent) of fluoroallyl amine, boiling point 70° C., $n_D^{20}$ 1.4029.

*Example 10*

Fluoroallyl chloride (9.45 grams, 0.1 mole) was refluxed with 20 grams (0.134 mole) of sodium iodide in 200 grams of dry acetone for fifteen minutes. After the reaction had cooled, solids were filtered from the solution and the filtrate was distilled. Ten grams (54 percent) of fluoroallyl iodide, boiling point 110° C. to 111° C., $n_D^{20}$ 1.5272, was thus obtained. The mass spectrum and infrared spectrum for this compound agree with the assigned structure.

In the same manner as above, the use of alkali metal fluoride or alkali metal bromide, in an appropriate solvent, produces fluoroallyl fluoride and fluoroallyl bromide, respectively.

*Example 11*

Fluoroallyl chloride and acrylonitrile were copolymerized at 25° C. using diisopropylperoxydicarbonate as a catalyst. A 50 percent yield of pale yellow powder was recovered which contained 32 percent fluoroallyl chloride and had a reduced viscosity of 0.40.

In the same manner, a copolymer of fluoroallyl chloride and methyl methacrylate was produced which was found to contain 46 weight percent fluoroallyl chloride.

What is claimed is:
2-fluoro-3-hydroxypropene.

References Cited by the Examiner
UNITED STATES PATENTS
2,594,184   4/1952   Ladd _____ 260—633 X

OTHER REFERENCES

Hatch et al.: Jr. Am. Chem. Soc. (1952), vol. 74 (1952).
Lovelace et al.: "Aliphatic Fluorine Compounds" (1958), pp. 143–4.
Pattison: "Toxic Aliphatic Fluorine Compounds" (1959), pp. 127–137.
Reppe et al.: "Chem. Abstract," vol. 50 (1956), p. 16776c.
Smyth et al.: "Ind. and Eng. Chem.," vol. 51, No. 10 (October 1959), pp. 75A–77A.

LEON ZITVER, *Primary Examiner.*

CHARLES B. PARKER, *Examiner.*

A. H. SUTTO, M. B. ROBERTO, J. E. EVANS,
*Assistant Examiners.*